(12) United States Patent
Hanson et al.

(10) Patent No.: US 6,685,328 B1
(45) Date of Patent: Feb. 3, 2004

(54) DISPLAY HAVING PLANAR LIGHT GUIDE WITH INTEGRALLY FORMED FRAME

(75) Inventors: William R. Hanson, Mountain View, CA (US); Shawn R. Gettemy, San Jose, CA (US); Sherri Fraser, San Jose, CA (US); Mark Oliver, Fox River Grove, IL (US)

(73) Assignee: plamOne, Inc., Milpitas, CA (US)

( * ) Notice: Subject to any disclaimer, the term of this patent is extended or adjusted under 35 U.S.C. 154(b) by 0 days.

(21) Appl. No.: 09/940,833

(22) Filed: Aug. 27, 2001

(51) Int. Cl.[7] ................................................ F21V 7/04
(52) U.S. Cl. .................... 362/31; 362/559; 362/581; 362/446; 349/58
(58) Field of Search ........................ 362/31, 560, 551, 362/559, 561, 26, 27, 581, 257, 433, 446, 455, 311, 382; 349/58, 65, 56, 61–63

(56) References Cited

U.S. PATENT DOCUMENTS

| | | | | | |
|---|---|---|---|---|---|
| 5,641,219 A | * | 6/1997 | Mizobe | ........................ | 362/31 |
| 5,786,665 A | * | 7/1998 | Ohtsuki et al. | ................ | 362/31 |
| 6,068,381 A | * | 5/2000 | Ayres | ........................... | 362/31 |
| 6,309,081 B1 | * | 10/2001 | Furihata | ....................... | 362/31 |
| 6,330,386 B1 | * | 12/2001 | Wagner et al. | ................. | 349/63 |
| 6,347,873 B1 | * | 2/2002 | Hosseini et al. | ............... | 362/31 |
| 6,352,350 B1 | * | 3/2002 | Ma | .............................. | 362/31 |

* cited by examiner

*Primary Examiner*—Alan Cariaso
*Assistant Examiner*—Ismael Negron

(57) ABSTRACT

The present invention provides a display assembly including a display screen, a planar light guide, a light source, a light bar, and a frame. The frame is integrally molded with the planar light guide to form a single component, wherein the top and said bottom of the light guide is not obstructed by the plastic frame. The planar light guide is disposed above the display screen and provides mechanical support of the display. The light bar is disposed between the planar light guide and the light source, and acts to couple light from the light source into the planar light guide.

20 Claims, 19 Drawing Sheets

DISPLAY HAVING PLANAR LIGHT GUIDE WITH INTEGRALLY FORMED FRAME

FIELD OF THE INVENTION

The present invention relates to the field of display screens. More specifically embodiments of the present invention relate to the field of portable electronic devices, such as personal digital assistants (PDAs), cell phones, pagers, digital watches etc.

BACKGROUND OF THE INVENTION

Illumination of the display screens was initially a predominant exercise in the digital watch industry. Digital watches had a small display screen and a single light source sufficient to illuminate that limited area, which, often, did not exceed one square inch. Consumer acceptance and the pragmatic use of such technology led to the adoption of screen illumination in the portable computer industry. In today's portable or hand-held computer industry backlighting systems are widely used to illuminate portable computer's display screens.

As the portable computer devices grew more popular and more features were added to their initial functions, larger display screens were required. Display screen surface gradually exceeded a few square inches and a single light source was not sufficient to illuminate such a large area. Present portable computers often use more than a single light source and even a multiplicity of light sources cannot efficiently illuminate rather large display screens used in today's portable computers.

The increase in the size of display screens presented another design issue in illuminating portable computer's display screens. A single light source or even multiplicity of light sources may result in some bright spots and some dark spots on the display screens. A bright spot may be so bright as to "wash out" any character or information displayed on that portion of the display screen, while the dark spot may leave the display screen too dark to read. A uniform dispersion of light across the display screen substantially reduces problems associated with "bright spots" and "dark spots".

Regardless of the type of the technology employed in providing light sources for illuminating a display screen, the efficient use of power is an immediate concern. Efforts are continuously made to produce an efficient power source; however, provident use of the light source helps elongate the life of a power source supplying power to the light source. Maximum brightness level can be achieved not only by a stronger power source, but also by preventing waste of light emitted from the limited supply of power available. Therefore a need exists to use the light sources available in the most efficient manner.

Additionally, most of the components used to manufacture a portable computer are relatively small and manual assembly of smaller size components is a common practice in the display screen industry. Cost of producing a portable computer can be reduced if the components used in the manufacturing of these devices were more integrated and number of assembly process steps can be reduced.

Thus a need exists for a portable computer system with a uniformly bright display screen which is efficiently illuminated. Furthermore, a need exists for a portable computer to maintain a clean (i.e., dust and debris free) display screen at all times. Additionally, a need exists for a method to assemble a display screen with a reduced number of steps in the assembly process.

SUMMARY OF THE INVENTION

Accordingly, embodiment of the present invention provide an apparatus, which efficiently improves the front-lighting system of handheld computers by reducing light loss along the edges of a planar light guide illuminating a display screen. Furthermore, the present invention provides a method of assembling display screens for portable computers with a minimum number of steps in the assembly process. Additionally, the present invention provides a method of assembly, which results in a portable computer substantially more resilient to the penetration of environmental dust in the display panel area.

These and other objects and advantages of the present invention will no doubt becomes obvious to those of ordinary skill in the art after having read the following detailed description of the preferred embodiments which are illustrated in the various drawing figures.

A display assembly for portable computers is disclosed. The display assembly includes a display screen, a light source, and a planar light guide having a top and a bottom surface. The planar light guide includes a plurality of microstructures, which are properly placed on either the top surface or the bottom surface of the planar light guide. The display assembly further includes a light bar disposed adjacent to the light source for illuminating the planar light guide. In one embodiment of the present invention a plastic frame, which mechanically supports the display assembly and the planar light guide are combined as a single component.

A display assembly for efficiently improving brightness of a display screen in a portable computer system is disclosed. One embodiment of the present invention discloses molding a planar light guide wherein a plurality of microstructures are properly placed on either the top surface or the bottom surface of the planar light guide. This embodiment of the present invention further discloses molding of a plastic frame which is surrounded with a reflective material around its inner perimeter to contain light within the planar light guide. In one embodiment of the present invention, the planar light guide and the plastic frame are made into a single piece by process of co-molding or insert molding, thus facilitating the assembly process. In another embodiment of the present invention plastic material used to mold the planar light guide and the plastic frame are of different types. Materials used for molding the plastic frame and the planar light guide have a high optical index of refraction difference with respect to one another. In another embodiment of the present invention a reflective material and at least one mechanical structure are inserted in the mold prior to injection of plastic to make the plastic frame portion of the single piece plastic frame and planar light guide.

Still in another embodiment of the present invention, the planar light guide and a light bar are co-molded and a brightness enhancement film may be disposed between the planar light guide and the light bar. Another embodiment of the present invention discloses combination of the planar light guide, the light bar and the reflective material surrounding the light bar to form a single piece, further reducing steps in the assembly process.

By co-molding components together, embodiments of the present invention (1) provide more efficient light distribution over the display screen; (2) provide a more rigid and mechanically robust display assembly and hand-held device; and (3) reduce overall assembly steps required to manufacture the display unit. Assembly is improved because fewer single pieces are involved and the pieces are physically larger to handle.

DETAILED DESCRIPTION OF THE INVENTION

Reference will now be made in detail to the preferred embodiments of the present invention, an apparatus for improved front-lighting system for a handheld device display screen, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Figure 1:
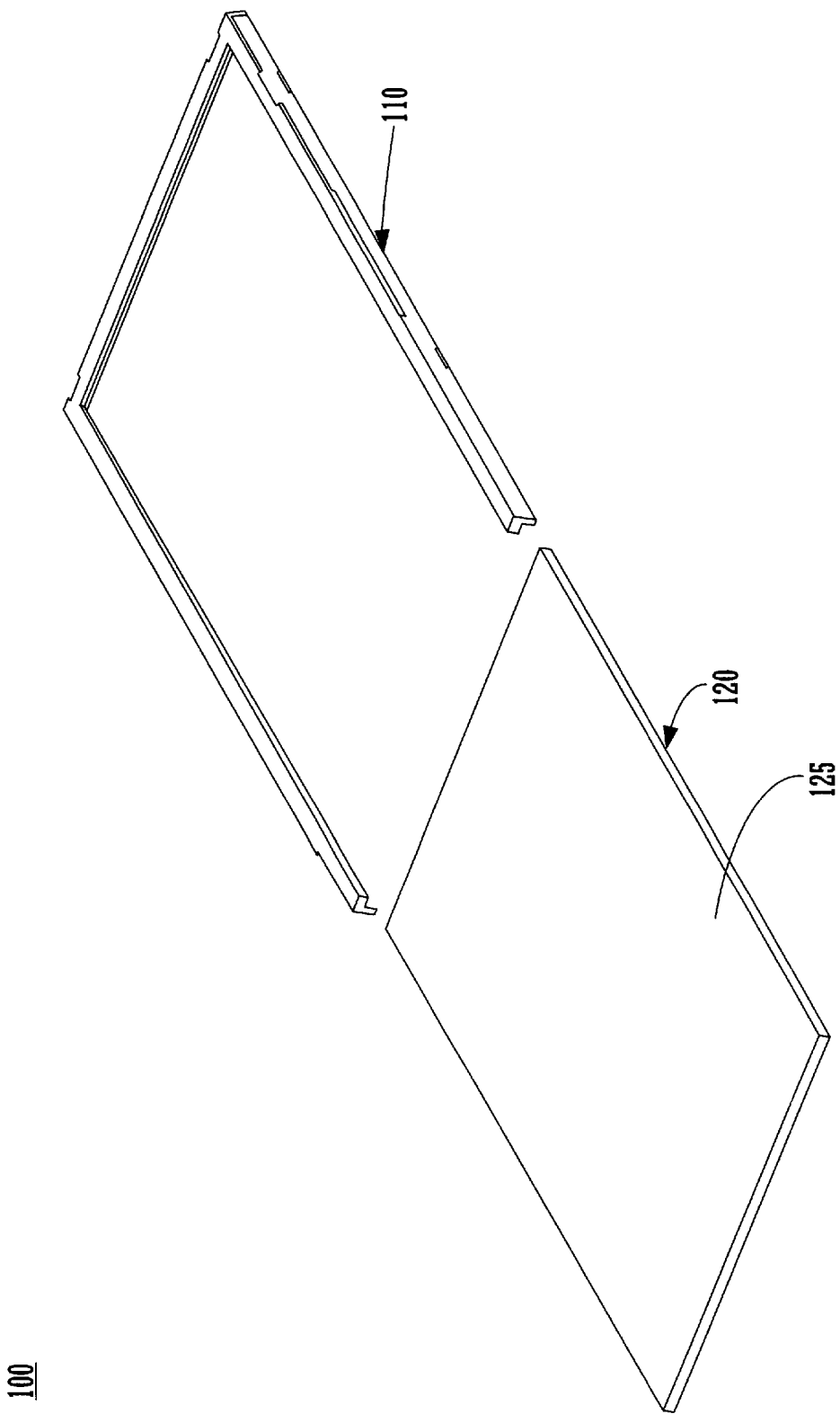
FIG. 1 is an illustration of a planar light guide and a plastic frame.

FIG. 1 is an illustration of a planar light guide 120 and a plastic frame 110. Planar light guide 120 is made out of transparent material and includes a plurality of well known microstructures 126 (not shown) configured to guide the light from light source 510 of FIG. 5A and reflect the light to illuminate a flat panel display screen. Planar light guide 120 has a top surface 125 and a bottom surface (not shown) opposite top surface 125.

Figure 2A:
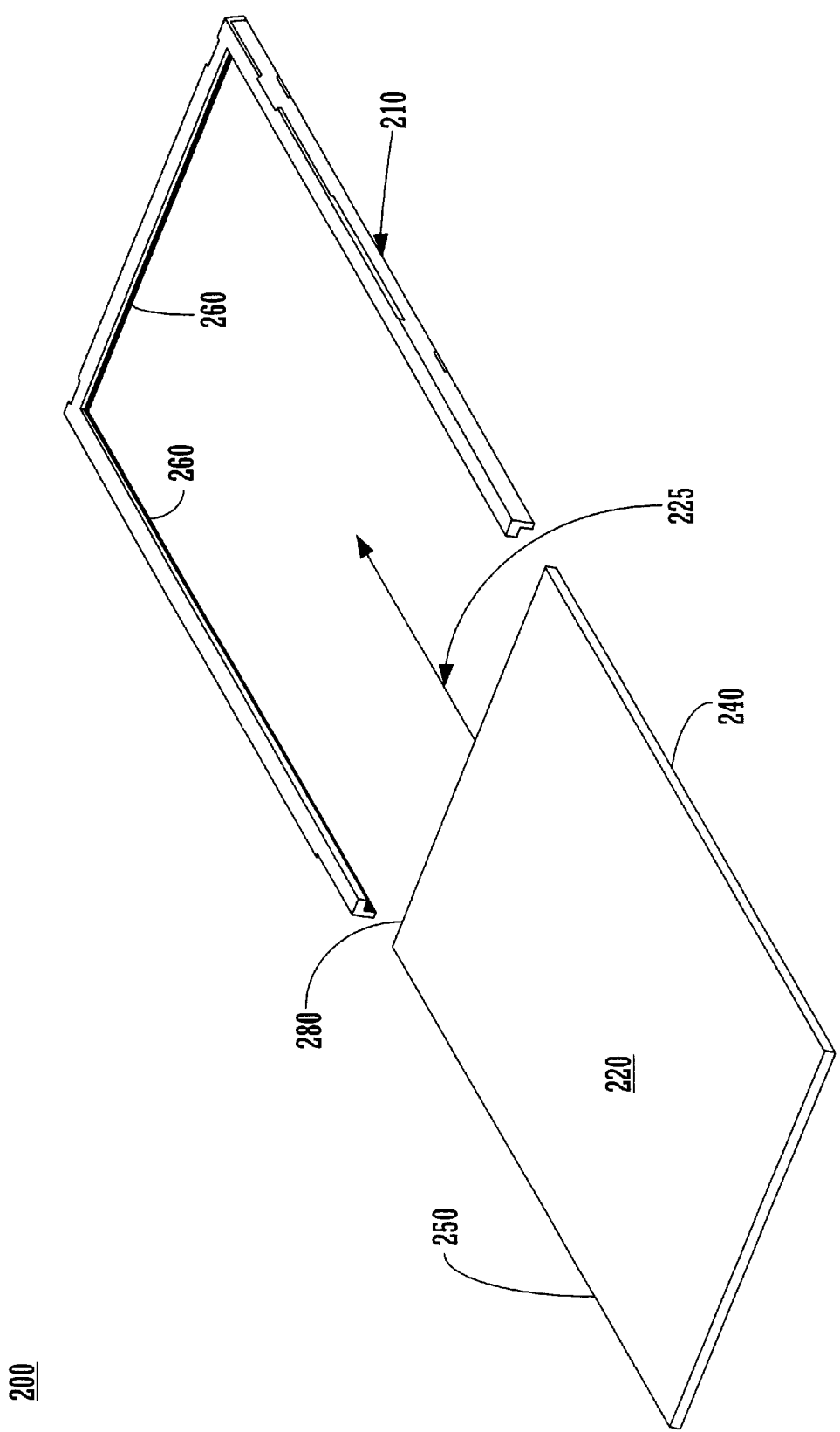
FIG. 2A depicts a mold configured to receive a planar light guide for a co-molding process.

FIG. 2A illustrates mold 210, which is used to form plastic frame 110. In one embodiment of the present invention, mechanical features 240, 250 and highly reflective material 260, reflective film or the like, may be in-mold decorated prior to forming plastic frame 110. Planar light guide 120 is pushed in direction 220 inside mold 210 prior to injection of plastic material inside mold 210. Highly reflective material 260 is disposed inside mold 210 such that once planar light guide 120 is positioned inside mold 210, highly reflective material 260 will come to close proximity of planar light guide 120 along its edges 150, 180, and 140. Plastic material is injected inside mold 210 to form plastic frame 110 which is co-molded with planar light guide 120 and highly reflective material 260 into a single piece, in accordance with an embodiment of the present invention.

By molding the frame 110 and planar light guide 120,e.g., using co-molding or insert molding, this embodiment provides fewer assembly pieces and provides a more mechanically robust, rigid, assembly. When the optional reflective material is added around the planar light guide edges, the overall brightness efficiency of the display is also increased.

Figure 2B:
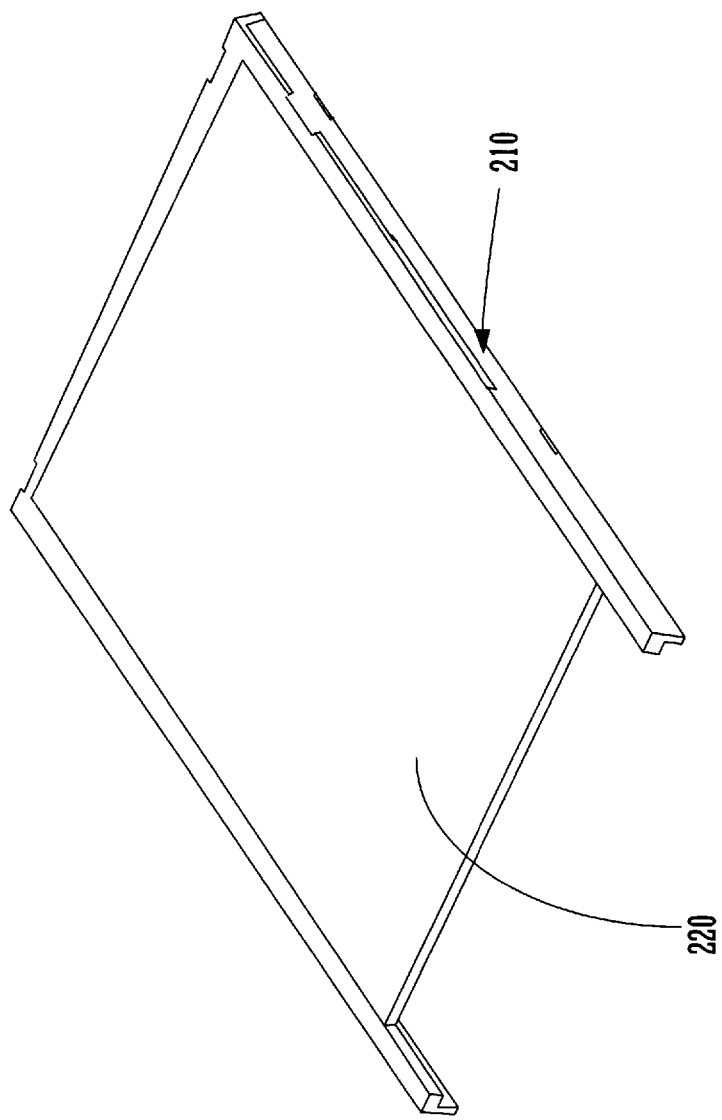
FIG. 2B depicts a planar light guide inside a mold ready to be injected with plastic to co-mold the plastic frame.

FIG. 2B depicts planar light guide 120 inside mold 210 with mechanical features 240 and 250 disposed along edges 140 and 150 of planar light guide 120, resulting from the operation explained in FIG. 2A. According to one embodiment of the present invention, once plastic is injected inside mold 210, planar light guide 120 and the resulting plastic frame 110 form a single component or piece.

Figure 2C:
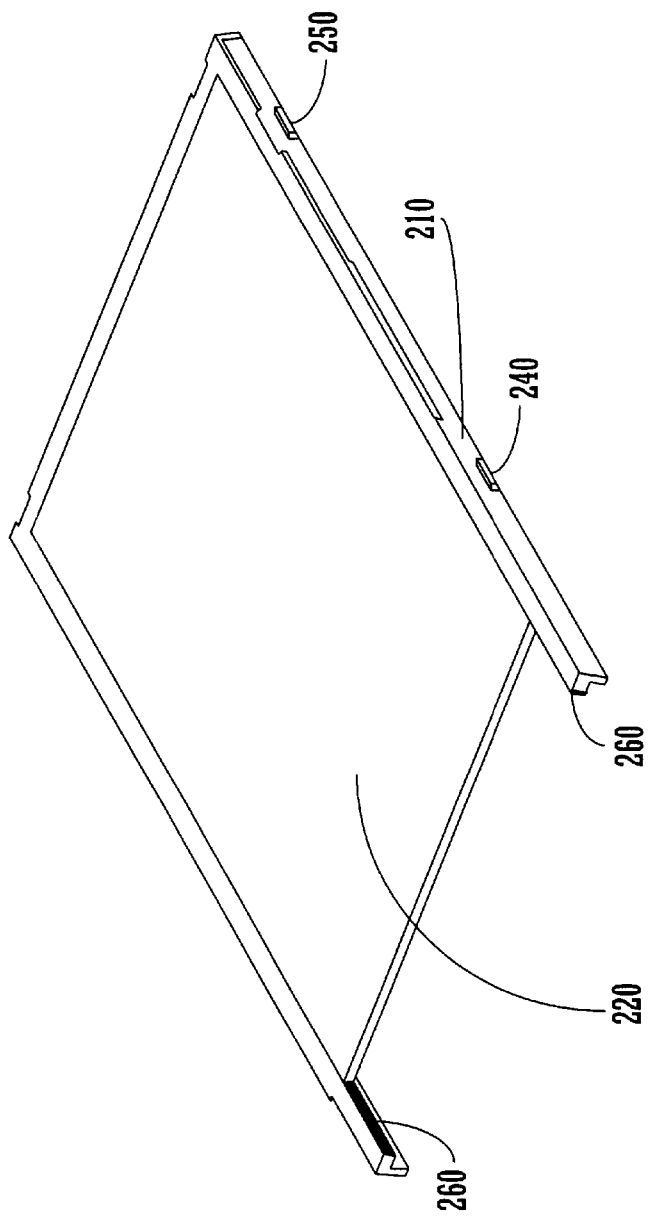
FIG. 2C is an embodiment of the present invention with the planar light guide and the plastic frame co-molded into a single component.
Figure 4A:
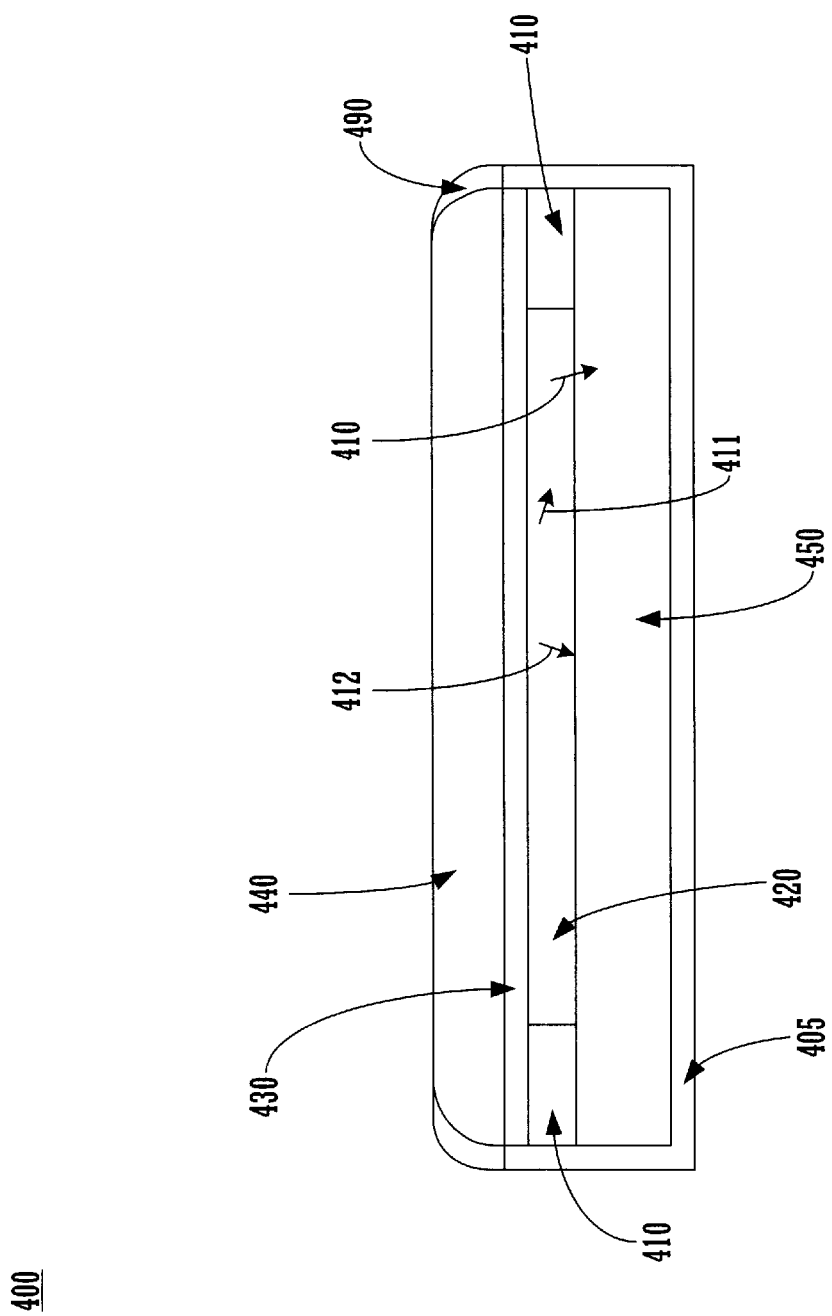
FIG. 4A depicts a cross section of an exemplary portable computer system where a planar light guide and a plastic frame are comolded together to form a single component.

FIG. 2C depicts an embodiment of the present invention where planar light guide portion 120 and plastic frame portion 110 are molded together, using insert molding techniques, with mechanical features 240, 250 and reflective material 260 disposed between planar light guide 120 and co-molded plastic frame 110. This embodiment of the present invention causes planar light guide 120 and plastic frame 110 to form a single component, resulting in the reduction of at least one step in the assembly processes of the portable computer system 400 (FIG. 4A). Furthermore, highly reflective material 260 disposed along edges 140, 150, and 180 of planar light guide 120 and plastic frame 110 substantially reduces light loss along edges 140, 150 and 180 of planar light guide 120.

It is appreciated that in-mold decoration may be used in conjunction with either co-molding process or in insert molding process.

Figure 3:
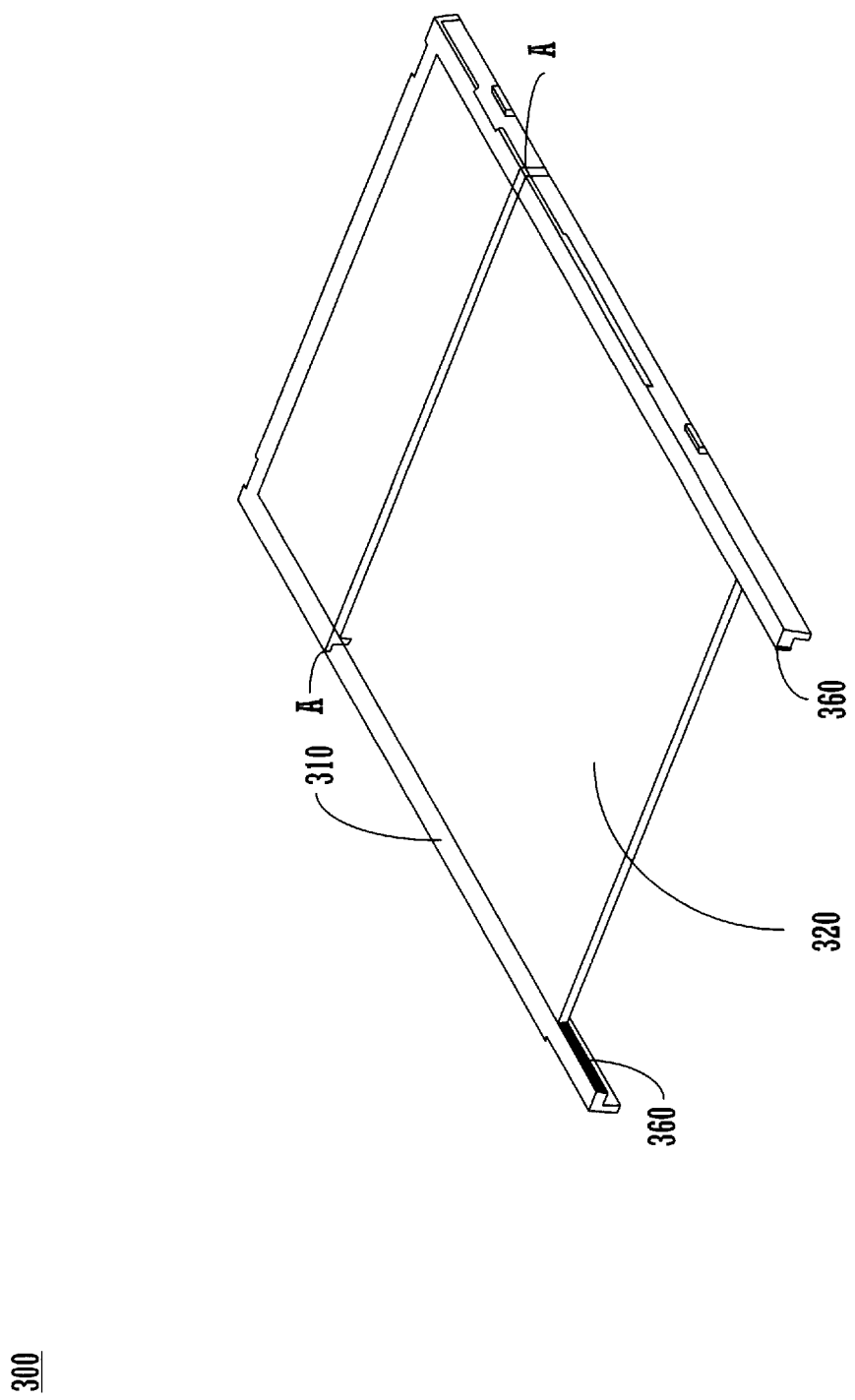
FIG. 3 depicts a cross section of a planar light guide and a plastic frame co-molded together with a highly reflective material disposed between the planar light guide and the plastic frame.

FIG. 3 depicts a cross-section of planar light guide 120 and plastic frame 110 co-molded together. In one embodiment of the present invention, planar light guide 120 portion located inside plastic frame 110 portion with highly reflective material 260 covering planar light guide 120 potion's edges 140, 150, and 180 (not shown).

FIG. 4A depicts an embodiment of the present invention where an exemplary portable computer system 400 is cross-sectioned in the display screen area along section 390 of FIG. 3. Frame 420 is a protective frame. Bezel 490 covers a portion along the edges of touch screen 440. Display screen 450 (e.g. a liquid crystal display) displays data and figures generated by system 400. Planar light guide 120, including a plurality of microstructures 126 (not shown) reflects light emitted from light bar 530 of FIG. 5A downwardly, in different directions within planar light guide 120 (e.g., 41b, 411, 415) illuminating display screen 450. Touch screen 440 is made of a transparent material and is used to protect system 400, to view display screen 450 and to interface with system 400. Space 430 between planar light guide 120 and touch screen 440 is designed to protect planar light guide 120 from friction resulting from excessive use of touch screen 440.

Co-molded planar light guide 120 and plastic frame 110 eliminate spaces between planar light guide 120 and plastic frame 110, which traditionally existed in the prior art. In embodiment of the present invention, elimination of space between planar light guide 120 and plastic frame 110 causes light rays which shine in the direction of the edges 140, 150, and 180 of planar light guide 120 (e.g., 410, 411) to reflect back into planar light guide 120 reducing light loss along the edges.

Figure 4B:
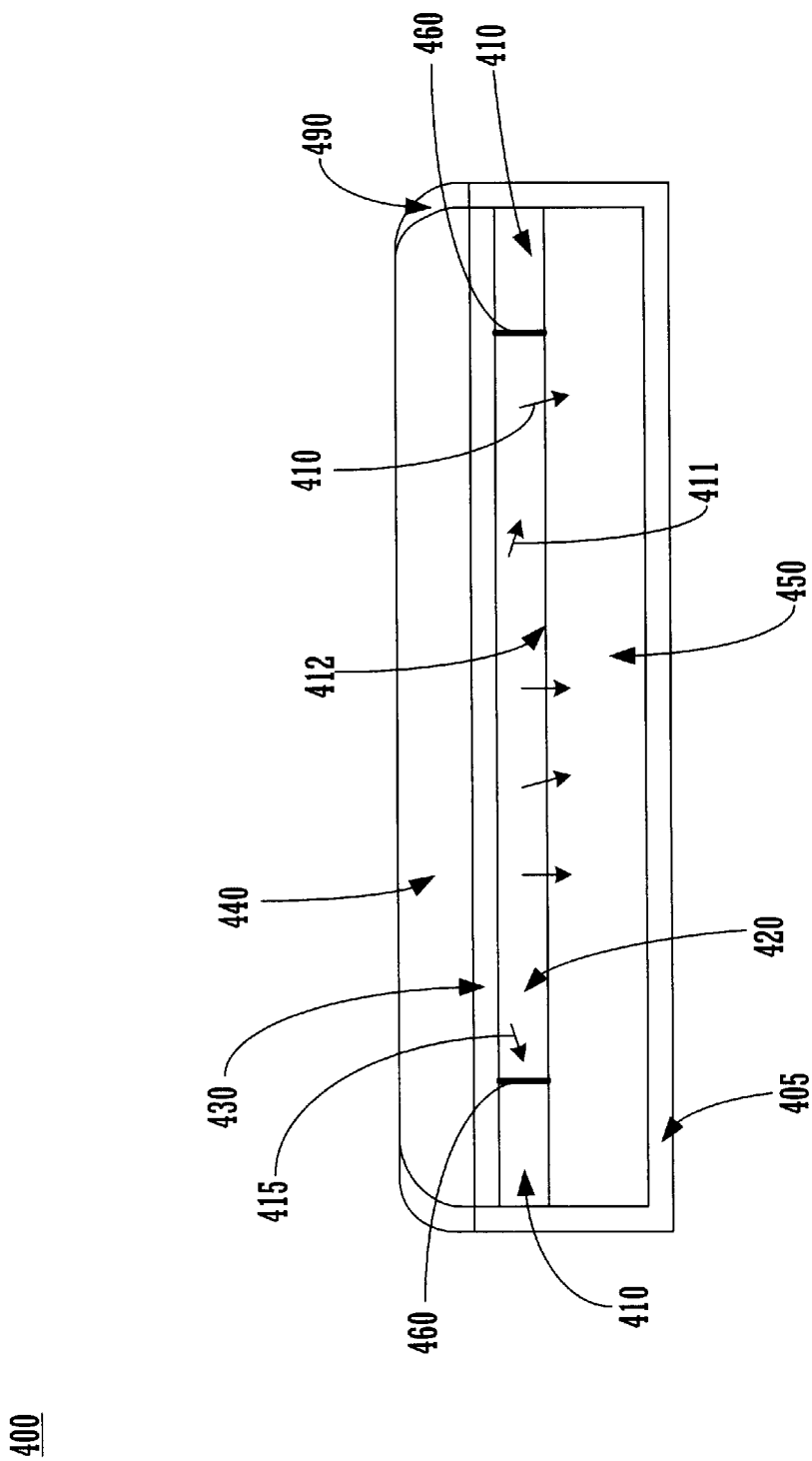
FIG. 4B depicts a cross section of an exemplary portable computer system where a planar light guide, a plastic frame and a highly reflective material are molded together to form a single component.

FIG. 4B depicts an embodiment of the present invention where optional reflective material is disposed (e.g., in-mold decoration or insert molding processes) between planar light guide portion 120 portion and plastic frame 110 portion. Generally, light traveling inside a medium such as planar light guide 120 portion will travel in all directions. A portion of the light traveling inside planar light guide 120 reach edges 140, 150, and 180 and reflects back when it hits plastic frame 110, but some portion of the light escapes planar light guide 120. Placing a highly reflective material around planar light guide 120 portion along edges 140, 150, and 180 results in reducing light escape and enhancing illumination of the display screen 450.

Figure 5A:
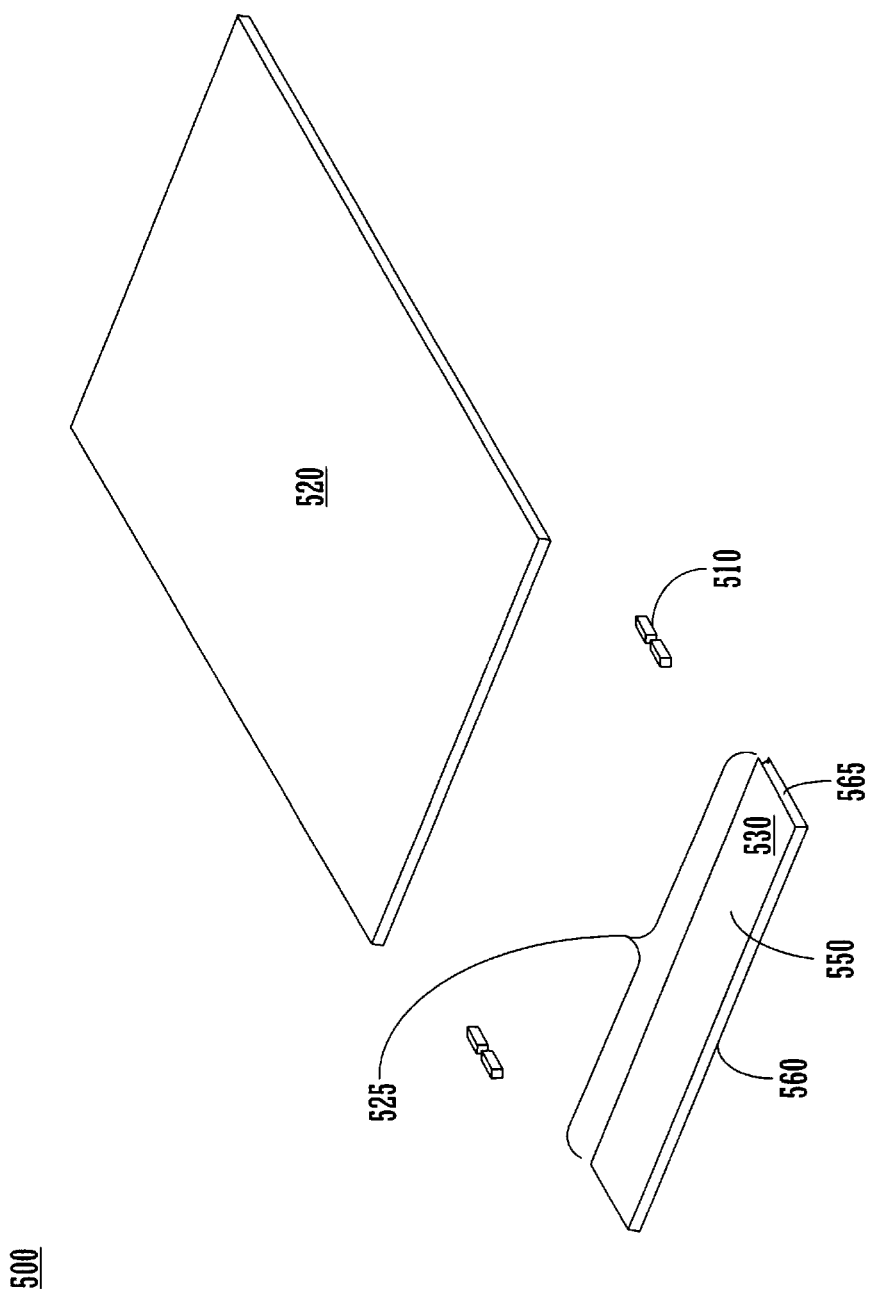
FIG. 5A is illustration of another embodiment of the present invention where a planar light guide and a light bar are molded together as a single component.

FIG. 5A is an illustration of another embodiment of the present invention where planar light guide 120 and light bar 530 are co-molded to form a single component. Light bar 530 is used to uniformly illuminate planar light guide 120 from light sources 510 disposed on either end of light bar 530. Light bar 530 may be covered with a highly reflective material on its top surface 550, back edge 560 and bottom surface (not shown) opposite top surface 550 using in mold decoration or insert molding. Co-molding planar light guide 120 and light bar 530 eliminates any space between planar light guide 120 portion and light bar 530 portion thus resulting in planar light guide 120 capturing substantially all light traveling out of light bar 530 portion along edge 520. Use of the reflective material on top surface 550, back edge 560 and bottom surface opposite top surface 550 of light bar 530 also eliminates the need for a metal bracket as used in the prior art.

It is appreciated that light source 510 may be located along the edges 560, 565 or the edge opposite to edge 565 (not shown) of light bar 530.

Figure 5B:
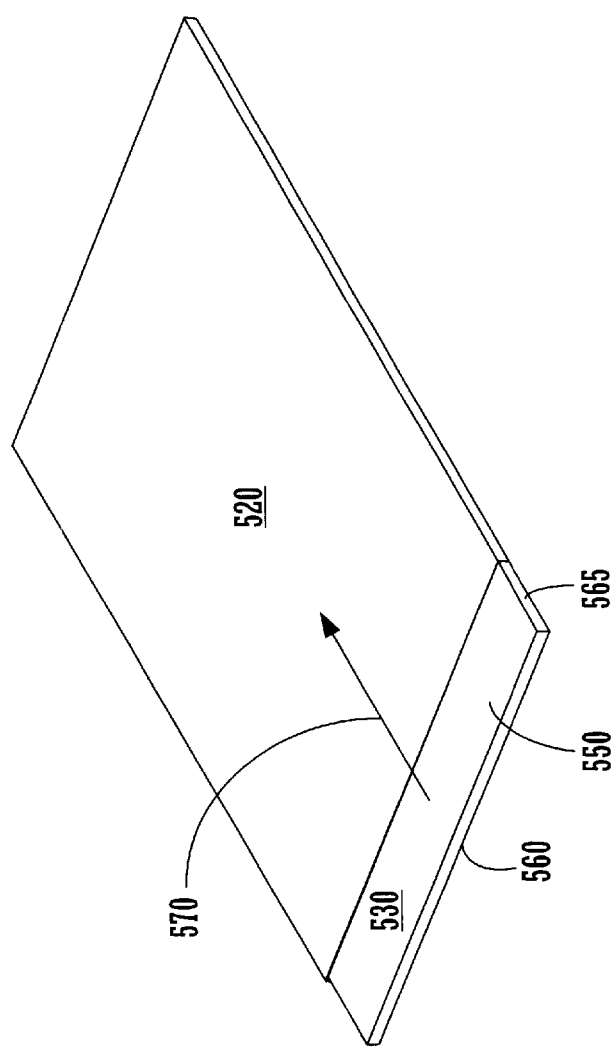
FIG. 5B is illustration of another embodiment of the present invention where a planar light guide and a light bar are molded together as a single component.

FIG. 5B is depiction of light bar 530 and planar light guide 120 after co-molding process. Light from at least one light source 510 shines into planar light guide 120 along front edge 520 of FIG. 5A and travels without escape into planar light guide 120 in the general direction 570.

Figure 5C:
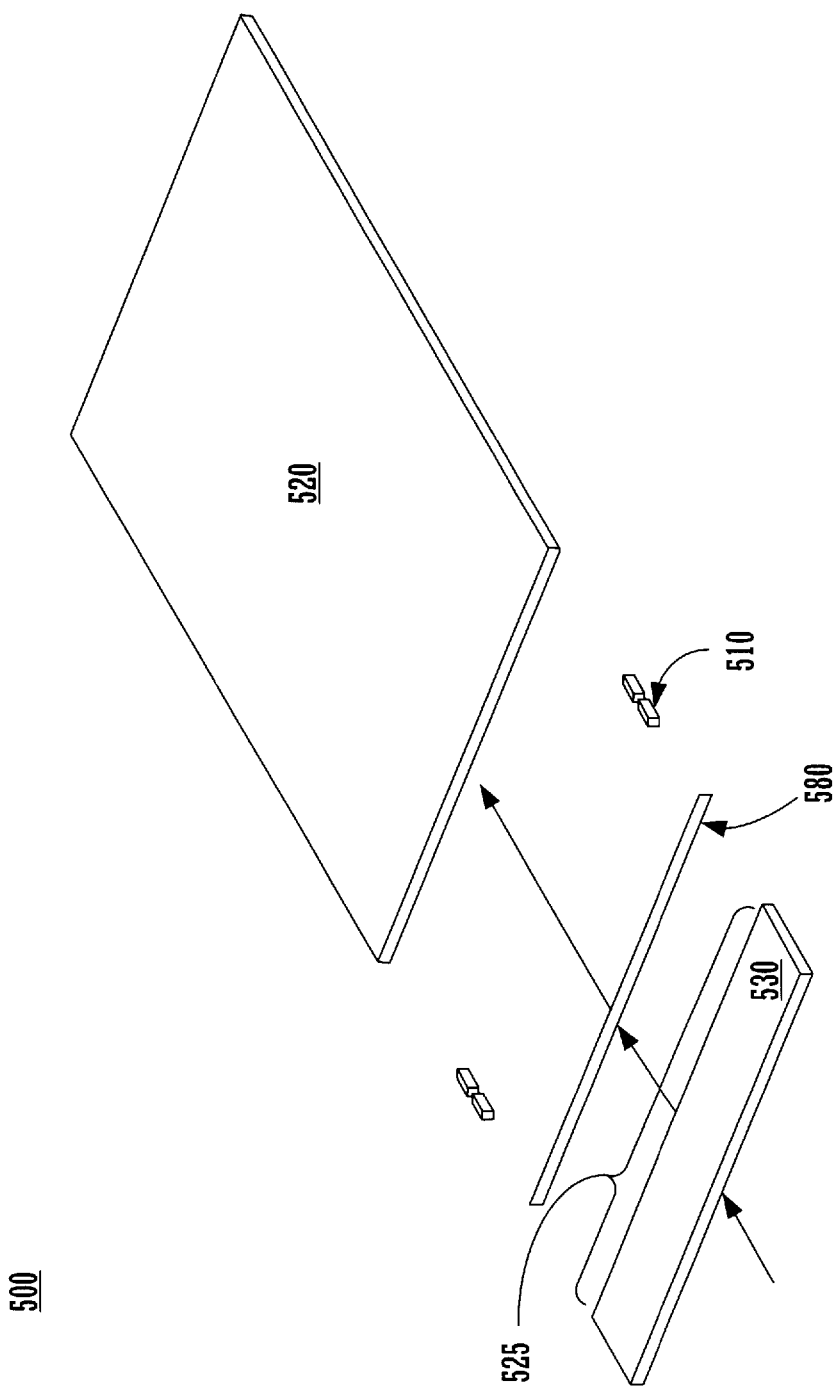
FIG. 5C is illustration of another embodiment of the present invention where a planar light guide, a brightness enhancement film and a light bar are molded together as a single component.

FIG. 5C depicts another embodiment of the present invention where an optional brightness enhancement film (BEF) 580 is disposed between light bar 530 and planar light guide 120. BEF 580 enhances capturing of substantially all light emitted from front edge 520 of planar light guide 530 by planar light guide 120. In one embodiment of the present invention disposition of BEF 580 is achieved through co-molding.

In another embodiment of the present invention, disposition of BEF 580 between planar light guide 120 and light bar 530 is performed via insert molding.

Figure 6A:
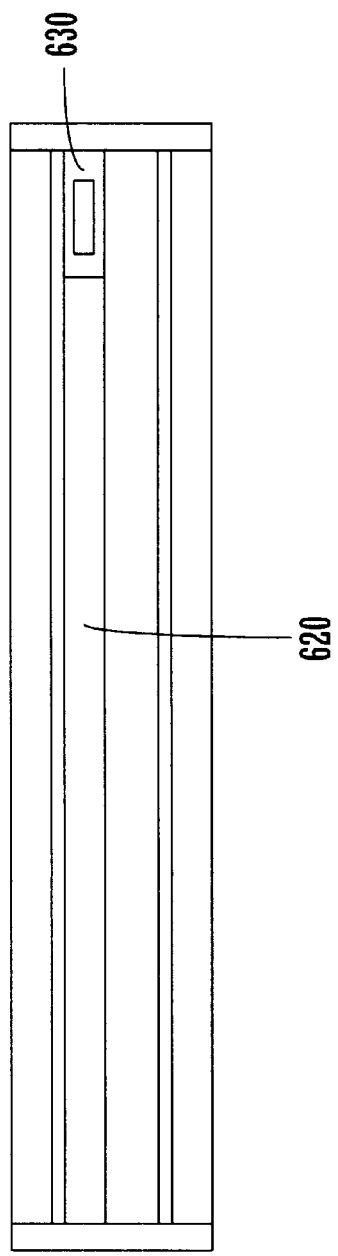
FIG. 6A depicts a cross section of a portable computer in accordance with the present invention.

FIG. 6A is a cross section of an exemplary portable computer system 600 where light bar 530 and planar light guide 120 are molded to form a single component. FIG. 6A depicts the cross section along the length of an exemplary portable computer 600.

Figure 6B:
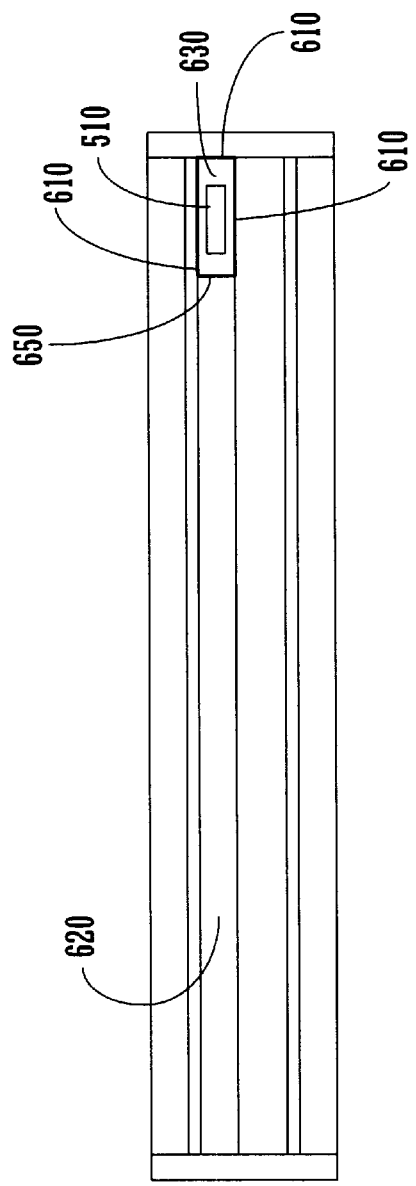
FIG. 6B depicts a cross section of a portable computer with the light bar covered with a brightness enhancement film in the front section facing the planar light guide and with a highly reflective material on the top surface, the bottom surface and the back edge in accordance with the present invention.

FIG. 6B is a cross section of an exemplary portable computer system 600. In this embodiment of the present invention, light bar 530 and planar light guide 120 are co-molded to form a single component. Light bar 530 is covered with highly reflective material 610 on top surface 550, back edge 560 and bottom surface opposite surface 550 of FIG. 5B and brightness enhancement film 650 is disposed between planar light guide 120 and light bar 530. Placement of highly reflective material 61G reduces light loss from top surface 550, back edge 560 and bottom surface of light bar 530.

Figure 7A:
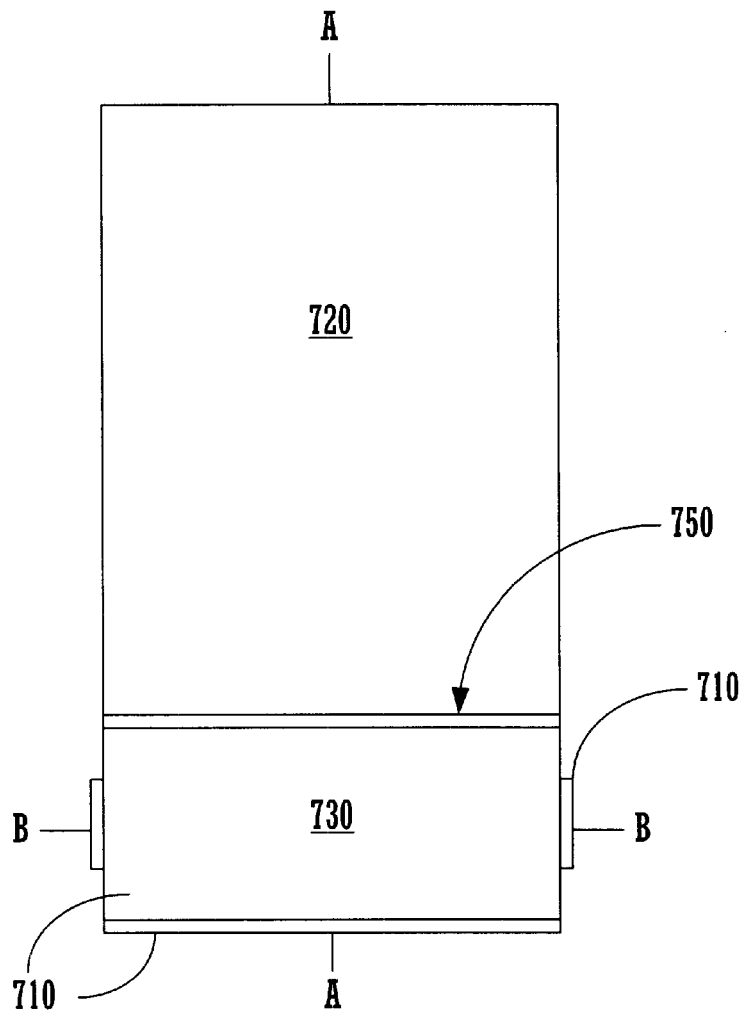
FIGS. 7A, 7B, and 7C depict different views of a single component including the light bar, the planar light guide, a plurality of light sources, brightness enhancement film and the highly reflective covering some portion of the light bar.
Figure 7B:
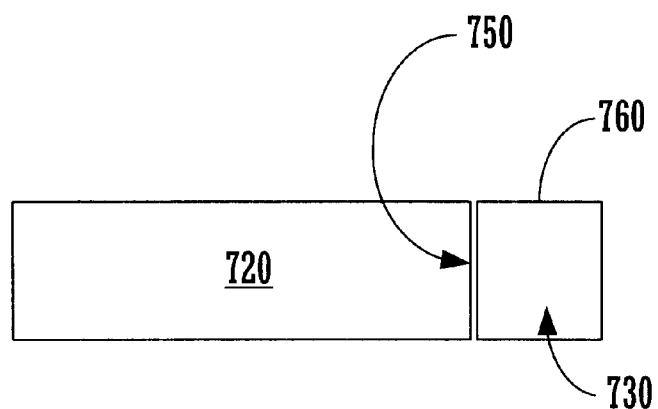
Figure 7C:
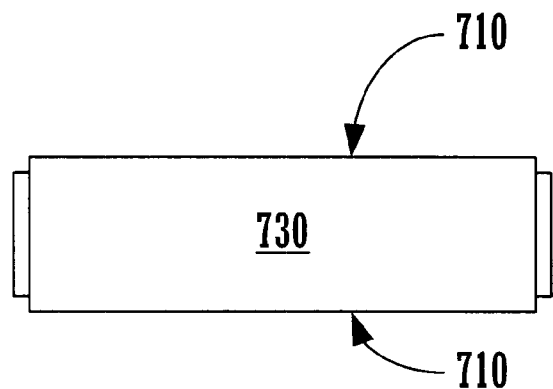

FIGS. 7A, 7B, and 7C depict different views of an embodiment of the present invention combining light bar 530 and planar light guide 120 forming a single component.

FIG. 7A depicts a top view of light bar 530 and planar light guide 120 co-molded as a single component with highly reflective material 610, BEF 650 and light sources 510.

FIG. 7B depicts a cross section along A—A of single component 710. Light bar 530 and planar light guide 120 are co-molded as a single component with highly reflective material 610 BEF 650.

FIG. 7C depicts a cross section of single component 710 along B—B, light bar 530 and planar light guide 120 are co-molded as a single component with highly reflective material 610.

Figure 8:
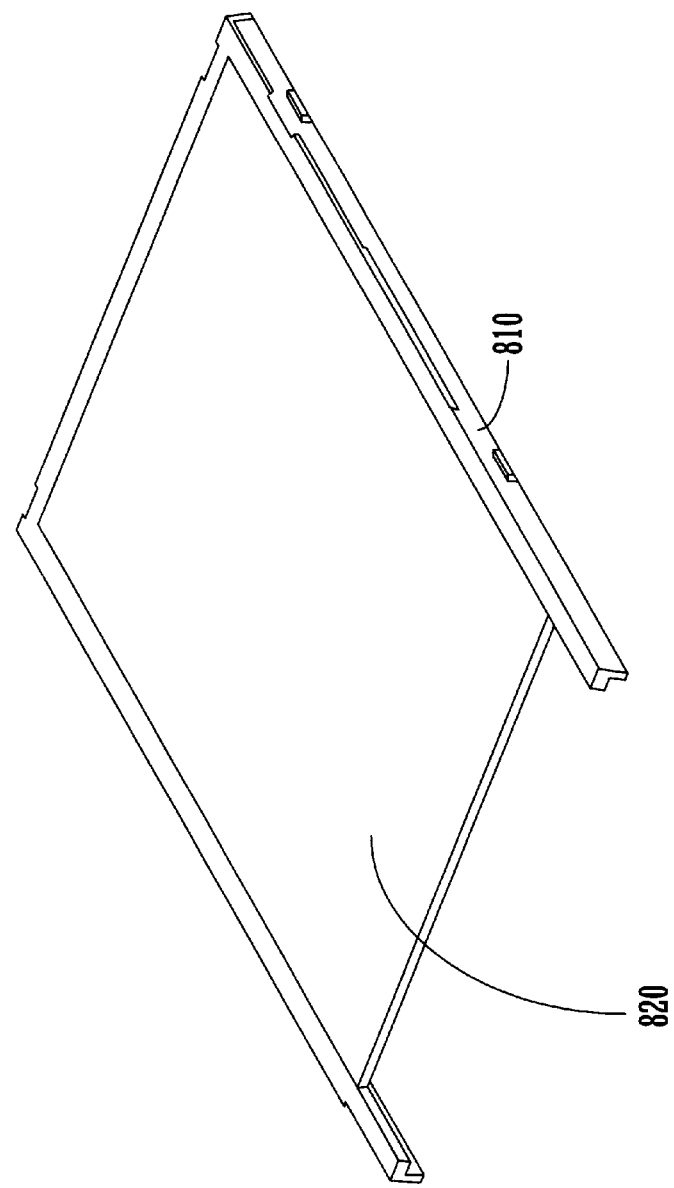
FIG. 8 is another embodiment of the present invention where the planar light guide and the plastic frame are made out of two different plastic materials.

FIG. 8 depicts another embodiment of the present invention where planar light guide 120 portion and plastic frame 110 portion are co-molded with different plastic materials. The index of refraction between the two materials is such that light rays traveling through planar light guide 120 reflect back into planar light guide 120 when hitting plastic frame 110 portion.

Figure 9A:
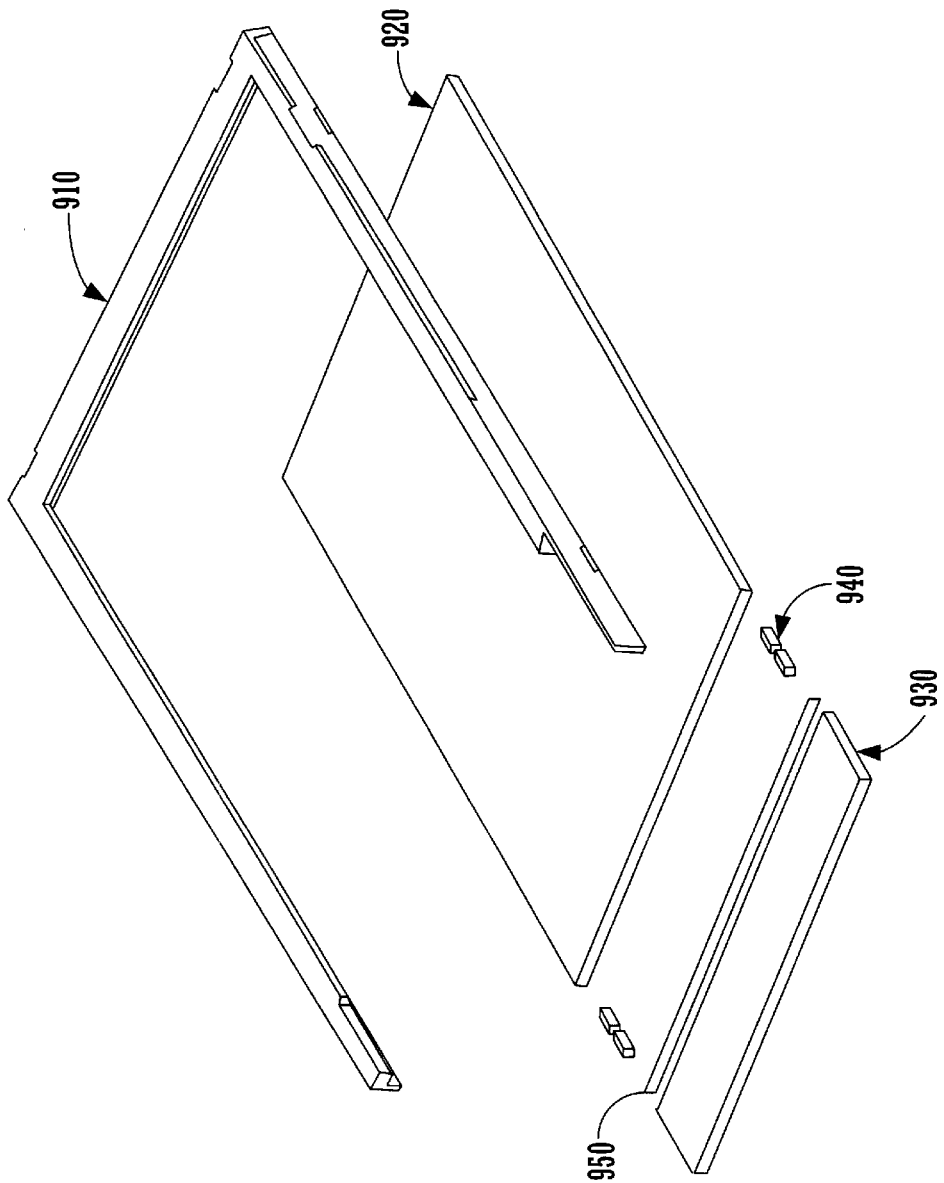
FIG. 9A is an embodiment of the present invention where the planar light guide, the plastic frame, the light bar, the brightness enhancement film and the plurality of light sources are combined to form a single component.

FIG. 9A is an embodiment of the present invention where planar light guide 120, plastic frame 110, light bar 530, brightness enhancement film 650 and a plurality of light sources 510 are co-molded to form a single component. This embodiment of the present invention reduces steps in assembly process and enhances illumination of display screen 450 by prevention of light escape.

Figure 9B:
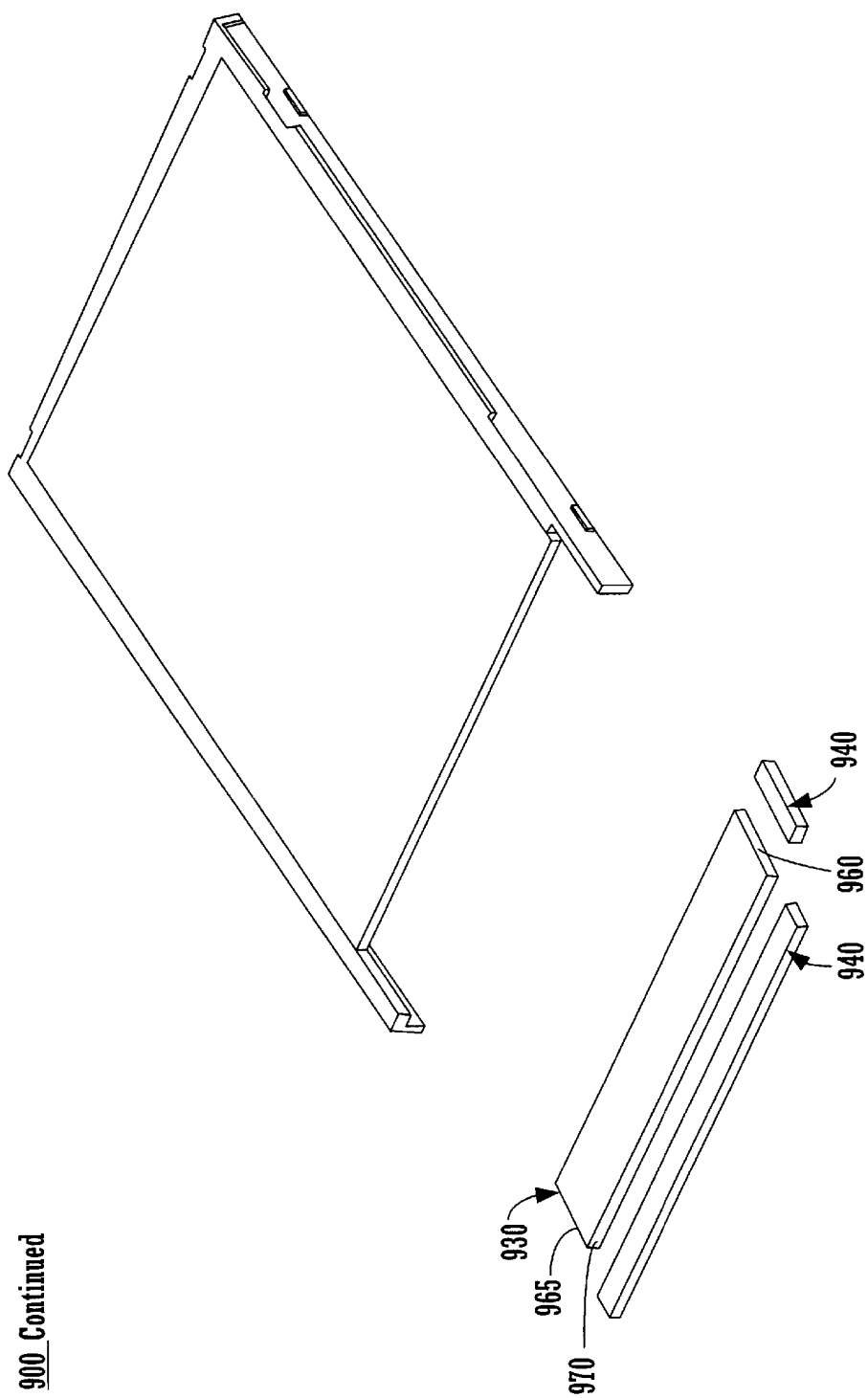
FIG. 9B depicts a light source located along the back edge of the light bar.

FIG. 9B depicts light source 510 located along the back edge of light bar 530. Light source 510 may be located along side edge 530 or the side edge opposite side edge 530 (not shown) of light bar 530. Also, light source 510 may be located along back edge 560 of light bar 530. It is appreciated that light source 510 may be a single light source or point as depicted in FIG. 5B or along an entire edge as depicted in this figure. Furthermore light source may be a plurality of discrete light sources covering an entire edge of light bar 530.

Figure 10:
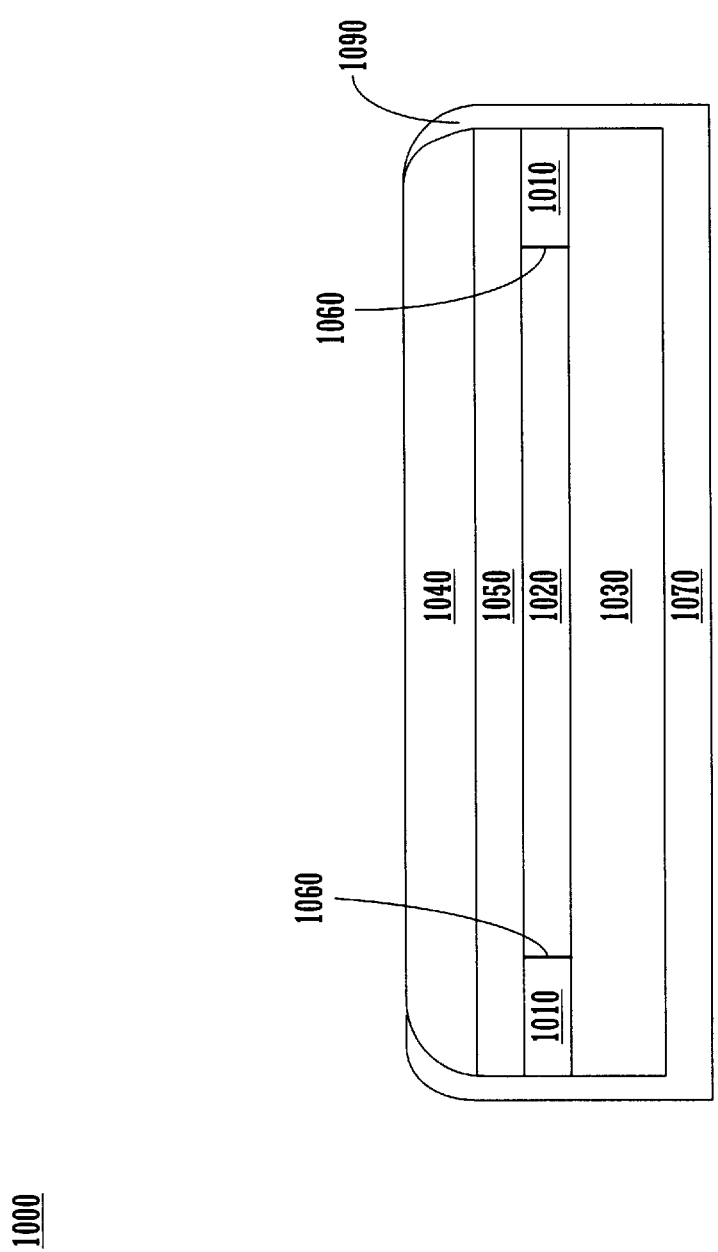
FIG. 10 depicts a cross section of a portable computer where five pieces used to make up a front-lighting system are molded into a single component.

FIG. 10 depicts a cross section of an exemplary portable computer 1000 where a single component including planar light guide 120 portion, light bar 530 portion (not shown) and plastic frame 110 portion are co-molded with highly reflective material (not shown) surrounding light bar and highly reflective material 260 disposed between planar light guide portion 120 and plastic frame portion 110. System 1000 further includes display screen 450 and light bar 110 portion. Touch screen 440 is separated from planar light guide 120 portion with space 430. Space 430 prevents damage to planar light guide 120 portion due to excessive use. Support frame 420 encompasses system 1000 and bezel 490 covers touch screen 440 along the front and side edges of planar light guide 120.

Single component 1000 includes planar light guide 120, light bar 530 and plastic frame 110 portion being co-molded with highly reflective material 260 surrounding light bar 530 and highly reflective material 260 disposed between planar light guide 120 portion and plastic frame 110 portion. The assembly of such portable computer results in an enhanced front-lighting system, which is made with a lesser number of steps and is resilient to environmental dust particle penetrating inside and forming a residue on display screen 450.

In summary, the embodiments of the present invention provide a method that can reduce steps in assembly as well as enhancing illumination of the front-light system. The method allows a manufacturer to assemble a portable computer using a single component for the front-lighting system rather five different pieces. The present invention further provides substantial savings in power consumption by providing a more efficient light distribution system. Additionally, the present invention provides a rigid system, which is substantially sealed and prevents environmental dust from infiltrating the system.

The foregoing description of specific embodiment of the present invention has been presented for purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A display assembly comprising:
   a) a display screen;
   b) a planar light guide, comprising a top and a bottom surface, disposed above said display screen;
   c) a light source, for illuminating said planar light guide;
   d) a light bar disposed between said planar light guide and said light source; and
   e) a plastic frame, for mechanical support of said display assembly and disposed about said planar light guide, wherein said plastic frame and said planar light guide are molded as a single component such that said plastic frame does not obstruct said top and said bottom of said light guide.

2. The display assembly as described in claim 1 further comprising a reflective film disposed between said planar light guide and said plastic frame using insert molding fabrication process.

3. The display assembly as described in claim 1 wherein said light bar comprises a top surface, a bottom surface and a back side, wherein said top surface, said bottom surface and said back side are covered with a highly reflective film.

4. The display assembly as described in claim 1 wherein said planar light guide and said plastic frame are formed from materials having different properties causing a difference in optical index of refraction between said planar light guide and said plastic frame.

5. The display assembly as described in claim 1 further comprising a reflective film disposed between a plurality of edges of said planar light guide and said plastic frame using in-mold decoration fabrication process.

6. The display assembly as described in claim 5 wherein said plurality of edges of said planar light guide comprises a back edge and at least two side edges and wherein said reflective film disposed between said plurality of edges of said planar light guide and said plastic frame is for preventing light loss from said front edge and said side edges.

7. A display assembly comprising:
   a) a display screen;
   b) a planar light guide, disposed above said display screen;
   c) a light source disposed adjacent said planar light guide;
   d) a light bar disposed between said planar light guide and said light source, wherein said light bar illuminates said light guide, and wherein said planar light guide and said light bar are combined as a single component; and
   e) a plastic frame, for mechanical support of said display assembly, disposed about a plurality of edges of said planar light guide such that viewing of said display screen through said planar light guide is not obstructed by said plastic frame.

8. The display assembly as described in claim 7 further comprising a brightness enhancement film disposed between said planar light guide and said light bar via insert molding fabrication process.

9. The display assembly as described in claim 7 further comprising a brightness enhancement film disposed between said planar light guide and said light bar via in-mold-decorating fabrication process.

10. The display assembly as described in claim 7 further comprising a reflective film disposed between said planar light guide and said plastic frame via insert molding fabrication process.

11. The display assembly as described in claim 7 wherein said light bar comprises a top surface, a bottom surface and a back side, wherein said top surface, said bottom surface and said back side are covered with a highly reflective film.

12. The display assembly as described in claim 7 where said planar light guide and said plastic frame are formed from different plastic materials causing a different optical index of refraction between said planar light guide and said plastic frame.

13. The display assembly as described in claim 7 further comprising a reflective film disposed between said plurality of edges of said planar light guide and said plastic frame via in-mold decoration fabrication process.

14. The display assembly as described in claim 13 wherein plurality of edges of said planar light guide comprises a back edge and at least two side edges and wherein said reflective film disposed between said plurality of edges said planar light guide and said plastic frame is for preventing light loss from said back edge and said side edges of said planar light guide.

15. A display assembly comprising:
   a) a display screen;
   b) a planar light guide, comprising a top and a bottom surface, disposed above said display screen;
   c) a light source disposed adjacent said planar light guide;

d) a light bar, for illuminating said planar light guide, disposed about said light source and disposed along one of a plurality of sides of said planar light guide; and e) a plastic frame, for mechanical support of said display assembly, wherein said plastic frame, said planar light guide and said light bar are co-molded as a single component and wherein said top and said bottom of said light guide is not obstructed by said plastic frame.

16. The display assembly as described in claim 15 further comprising a reflective film disposed between another of said plurality of sides of said planar light guide and said plastic frame, said reflective film being disposed via insertion molding process.

17. The display assembly as described in claim 15 wherein said light bar comprises a top surface, a bottom surface and a back side, wherein said top surface, said bottom surface and said back side are covered with a highly reflective film.

18. The display assembly as described in claim 15 where said planar light guide and said plastic frame are formed from materials of different properties causing a difference in optical index of refraction between said planar light guide and said plastic frame.

19. The display assembly as described in claim 15 further comprising a reflective film disposed between another of said plurality of sides of said planar light guide and said plastic frame, said reflective film disposed between via in-mold decoration processes.

20. The display assembly as described in claim 19 where said plurality of sides of said planar light guide comprises a front edge, a back edge and at least two side edges and wherein, said reflective film is disposed between said light guide and said plastic frame for preventing light loss from said back edge and said side edges of said light guide.

* * * * *